United States Patent [19]

Martin

[11] 4,451,094
[45] May 29, 1984

[54] HYDRAULIC TRAILER BRAKE

[76] Inventor: Jose L. Martin, Farallon No. 60, Playas de Tijuana, Seccion Costa de Oro, Tijuana, B.C., Mexico

[21] Appl. No.: 318,317

[22] Filed: Nov. 5, 1981

[51] Int. Cl.³ .............................................. B60T 13/16
[52] U.S. Cl. .................................... 303/10; 188/271; 188/294; 188/295
[58] Field of Search .................................. 303/10–12, 303/116, 7, 13; 188/290–296, 271, 83; 188/264 P, 71.1, 3 R

[56]  References Cited

U.S. PATENT DOCUMENTS

| | | | |
|---|---|---|---|
| 1,741,875 | 12/1929 | Paul | 188/294 |
| 2,105,712 | 1/1938 | Welch et al. | 188/294 |
| 2,718,937 | 9/1955 | Nawojski | 188/290 |
| 3,521,729 | 7/1970 | Ravenel | 188/271 |
| 3,882,975 | 5/1975 | Jedlitschka et al. | 188/290 X |

FOREIGN PATENT DOCUMENTS 2118382 12/1971 Fed. Rep. of Germany ...... 188/295

Primary Examiner—Douglas C. Butler
Attorney, Agent, or Firm—Brown & Martin

[57] ABSTRACT

A hydraulic brake system for ground driven wheels of a trailer includes a rotatable shaft driven by the wheels which in turn drives an axial piston hydraulic pump with a closed loop circuit with pressure control device for controlling the pressure within the circuit for controlling the load on the pump and, hence, the braking of the wheels. The system includes pressurized air control of a metering valve within the hydraulic circuit for controlling the pressure therein and includes air override of the hydraulic pressure for enabling the normally disabled pump.

7 Claims, 2 Drawing Figures

HYDRAULIC TRAILER BRAKE

BACKGROUND OF THE INVENTION

The present invention relates to brake systems and pertains particularly to brakes for heavy duty semi-trailer trucks.

Heavily loaded trailer trucks, which travel mountainous areas, must make extensive use of the trailer brake while traveling downgrade. The typical trailer brake system employs either disc or drum brakes with frictional pads or shoes engaging the discs or drums for imposing the braking action. Long extensive use of such brakes for long grades can frequently result in brake failure with the result that the vehicle will run away, out of control. Most downgrade areas have turnout auxiliary roads to permit such vehicles to turn off of the main road or highway when in danger of getting out of control. While disc and drum friction brakes are the most simple and inexpensive to construct and maintain and are very reliable for normal conditions, they are not entirely satisfactory for traversing long grades by heavily laden trucks.

Many attempts to improve brakes for such vehicles have met with limited amount of success. Such brake system must be capable of continuous application over a long period of time with effective dissipation of heat and energy without unnecessarily locking the trailer wheels or losing the ability to do so.

It is therefore desirable that improved brakes be available for the trailers of heavy cargo vehicles.

SUMMARY AND OBJECT OF THE INVENTION

Accordingly, it is the primary object of the present invention to provide an improved trailer brake for heavy duty cargo vehicles.

In accordance with the primary aspect of the present invention, a hydraulic brake for heavy duty cargo vehicles includes a rotary shaft driven by the trailer wheels which drives a hydraulic pump within a closed circuit system including means for controllably activating the pump and means for controllably restricting the flow within the circuit, thereby controlling the load on the pump.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
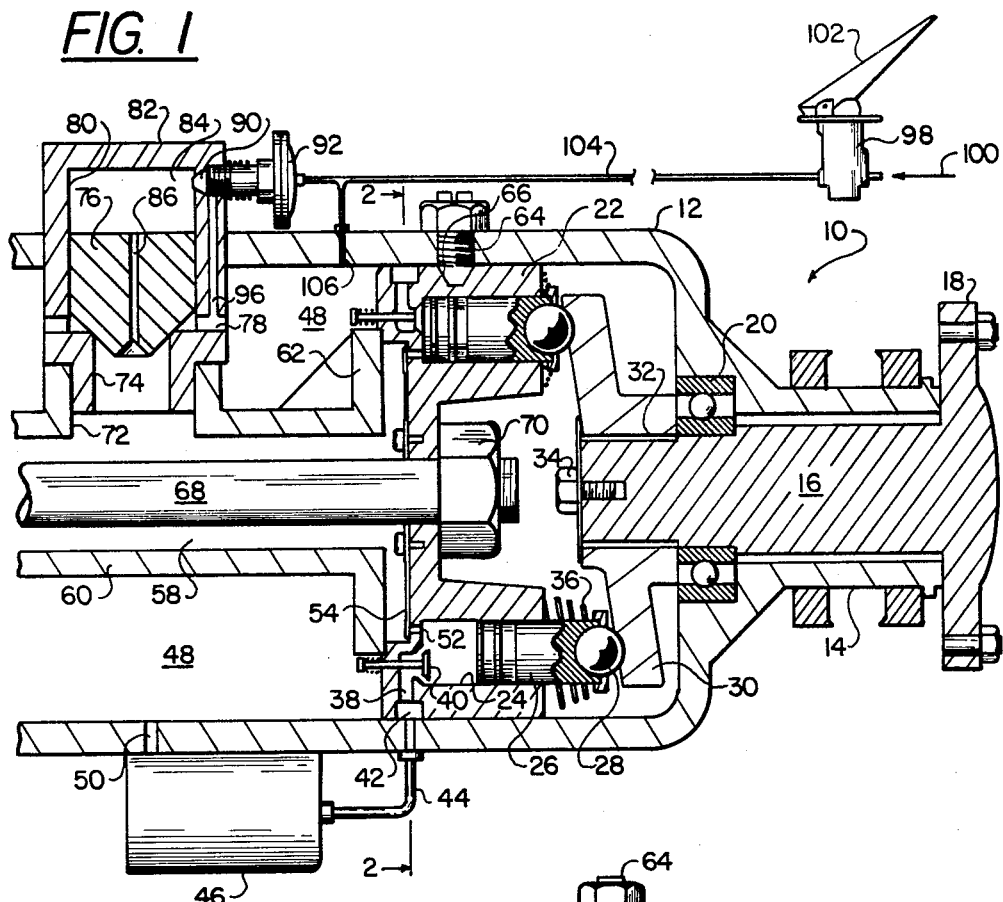
FIG. 1 is a side elevational view in section of a brake system in accordance with the invention.
Figure 2:
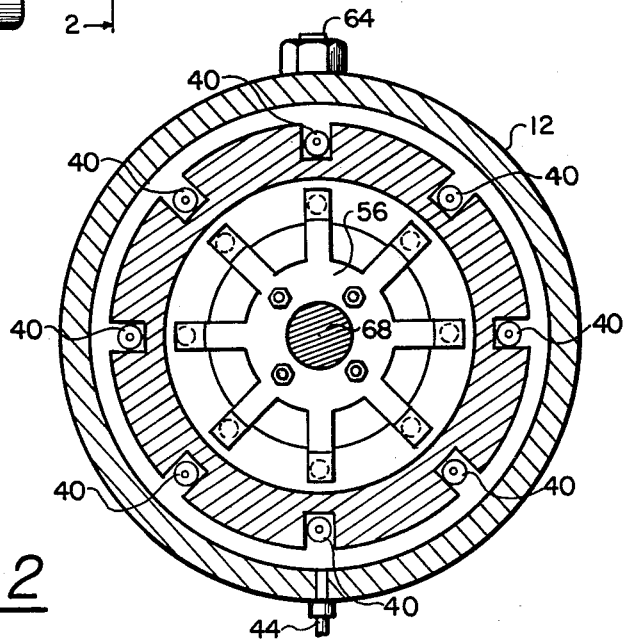
FIG. 2 is a sectional view taken generally on Line 2—2 of FIG. 2.

Turning to the drawings, there is illustrated a brake system in accordance with the invention, designated generally by the numeral 10 and incorporated in the end of a trailer or like axle for ground driven wheels. The axle comprises an elongated tubular housing 12 having a generally bell-shaped end including a reduced diameter cylindrical portion 14 in which is rotatably mounted a rotary stub axle or shaft 16. The axle or shaft 16 includes a radial flange 18 to which or on which wheels are mounted for support of the vehicle on which the axle is mounted. The shaft is rotatably mounted in suitable bearings 20 mounted within the housing 12. The axle, only one end of which is illustrated, is identical on both ends and has an identical brake arrangement on both ends. The axle is preferably separable between the ends to provide access to the interior thereof for servicing the brakes and axle. The two systems may share a common reservoir or may be completely separate as desired. The controls may be common or may be separate or capable of separate actuation also as desired. Implementation of the above common features can be carried out and will be apparent from the present disclosure without the necessity of duplication.

The brakes for the wheels which are mounted on shaft 16 comprise hydraulic brakes in the form of a pump with a restricted closed-loop fluid system. More particularly, the brake system includes pump-body or housing 22 having a generally cylindrical outer surface and mounted within the bore of the housing 12 in close fitting sealing engagement therewith. The housing 22 includes a plurality of bores or barrels 24 disposed annularly about the axis thereof parallel to the axis thereof and in which is mounted a plurality of reciprocating pistons 26. The pistons 26 include a suitable bearing 28 for engaging the face of an axial cam or wobble plate 30 which is mounted on the end of the shaft 16 by means of splines or the like 32 for rotation therewith. The wobble plate or cam plate 30 is held in place such as by means of a cap and screw 34.

These pistons 26 are normally biased to their fully retracted position as shown at the top of FIG. 1 by means of coiled tension springs 36 which act to pull or draw the piston to its bottom position. The pistons are forced outward for engagement with the camming face of cam 30 by means of pressurized fluid in the system as will be explained. A slight excess pressure in the fluid over and above the pressure or force of springs 36 results in forcing the pistons outward into engagement with the cam 30.

The pump cylinders 24 each include an inlet port 38 controlled by a poppet valve 40. The inlet ports communicate by way of a manifold including an annular passage way 42 communicating by suitable conduit means 44 with an oil cooler 46 which, in turn, communicates with the low pressure reservoir 48 by way of a port 50. The oil cooler 46 may take the form of a radiator or the like or any other suitable cooling means.

The pump cylinders include an outlet 52 controlled by a flap-type spring check valve 54. The illustrated pump has eight (8) axially aligned barrels in a array about the center axis thereof. A main valve unit 56 includes a plurality of spring check valve members 54 which radiate outward from a central hub, overlap and close each of the outlets 52 for each of the pump cylinders. The outlet passage 52 opens into a pressure chamber 58 formed by a cylindrical tube or housing 60 having a flange 62 engaging a spaced shoulder on the pump housing face 22 forming an annular outlet chamber from the respective cylinders.

The pump housing 22 is held in place within the axle housing 12 by means of a plurality of radial lugs or screws 64 which are threadably engaging in a bore in the housing 12 and extend into a recess 66 within the housing 22 for retaining the housing in place. The axle and further assembly of the housing 22 is held within engagement with the housing 60 by a tie or tension rod 68 which may extend the length of the axle engaging the opposite pump housing and including a nut 70 threadably engaging the end thereof.

Pressurized fluid from the pump is forced into the chamber 58 which communicates by way of a passage 72 including a valve seat 74 engaged and controlled by a check valve 76 controlling communication with the low pressure chamber 48 by way of passage 78. The pressure controlled check of relief valve 76 seats against the valve seat 74 and is reciprocately mounted within a bore 80 of the housing 82. The housing 82 includes a chamber 84 above the piston or valve member 76 with a communicating passage 86 extending the length of the valve member communicating between the chamber 84 and the forward end of valve 76. Fluid pressure from chamber 58 acting through passage 86 on the top of valve 76 (in chamber 84) keeps valve 76 seated, blocking communication of passage 72 with passage 78. The different areas of the valve 76 subject to the pressure define a differential check valve.

An air pressure controlled check valve 90 controlled by a pressure diaphragm or piston actuator 92 controls communication (i.e. venting) of fluid from chamber 84 above valve 76 by way of passage 96 to passage 78 and; into chamber 48. A diaphragm or piston, not shown, within the housing 92 is connected to valve 90 and acts under pressure supplied thereto by way of line 104 to force the valve 90 against its seat to prevent passage of fluid from chamber 84 by way of passage 96 and 78 to the chamber 78. The venting of chamber 84 permits valve 76 to unseat permitting free flow of fluid from pressure chamber 58 by way of valve passage 74 and passage 78 to the low pressure chamber 48. The air pressure controlled valve 90 is controlled by means of an air control system which is normally conventional on tractor trailer vehicles. This air system includes a brake control valve 98 which receives pressurized air from a source 100 and includes a valve or brake actuating lever or pedal 102 for controlling the communication of pressurized air by way of line or conduit 104 to the diaphragm or piston assembly 92 forcing valve 90 to remain seated and also by way of a branch line 106 into the chamber 48. The pressurized air supplied by way of the line 106 increases the pressure on fluid within the chamber 48 forcing that fluid to act against the seating springs of the intake valves 40 forcing fluid into the pump chambers 24 forcing the pistons 26 outward into engagement with the pump cam 30. This activates the pump, forcing pressurized fluid from the chamber by way of outlets 52 past valves 54 into the chamber 58. The pressure in chamber 58 is controlled by the action of the air valve 90 which acts to selectively vent fluid from chamber 84 permitting the valve 76 to unseat, permitting fluid to bypass by way of passage 78 into the chamber 48. Fluid within chamber 48 passes by way of passage 50 into the oil cooler and back to the intake manifold 42 by way of line 44.

The above described brake system, when no brakes are applied, i.e. by application of air pressure through brake valve 102, is in the inactive position with the pistons 26 drawn fully into the cylinders 24 by the springs 36. This permits the wobble plate 30 to rotate freely with shaft 16 without engagement with any of the piston bearing or followers 28. In order to activate the brakes a slight pressure is communicated from the source 100 to the diaphragm or piston 92 seating check valve or vent valve 90 maintaining valve 76 seated and, at the same time, directing air pressure into chamber 48 pressurizing the fluid therein overcoming the springs of the intake valves 42 forcing the pistons 26 outward into engagement with the cam 30. As the pressure increases within the system, the braking likewise increases.

Higher fluid pressures within the chamber 58 resulting from a maintained seating of the valve 76 increases the load on the pump and the shaft 16, thus the wheels on the shaft 16 can be prevented from rotating by the application of sufficient back pressure therein. The pressure acting on the back of spring check valves 54 acts on a larger area than that from cylinders 24 by way of outlet passages 52. Pressure communicated by way of passage 86 through valve 76 into chamber 84 without being vented applies a back pressure which exceeds the pressure on the forward end of the check valve or vent valve 76, resulting in maintaining the valve in the closed position. Thus, with the valve 76 closed and the valve 90 closed, the fluid within chamber 58 is prevented from passing from the chamber while fluid from chamber 48 is fed into the intake side of the cylinders. Fluid is attempted to be forced out into chamber 58 by the pump until the pressure reaches that sufficient to achieve the desired braking.

While I have illustrated and described my invention by means of specific embodiments, it is to be understood that numerous changes and modification may be made therein without departing from the spirit and scope of the invention as defined by the appended claims.

I claim:

1. A fluid brake system for braking the wheels of a vehicle, said brakes comprising:
   a housing,
   a rotary shaft mounted in said housing and having an end thereof extending from said housing for mounting and supporting a wheel,
   an axial piston wobble plate incompressible fluid pump mounted in said housing and driven by said rotary shaft, said pump having a fluid inlet and a fluid outlet,
   circuit means including said inlet and outlet, and reservoir means defining a closed loop circuit, and selectively controllable restricting means;
   an air pressure responsive check valve,
   a source of air pressure, and
   control means for selectively controlling air pressure on said check valve for selectively controlling the resistance of said fluid in said circuit.

2. The brake system of claim 1 wherein:
   said housing is an elongated tubular axle for supporting a vehicle,
   a cylindrical tube co-axially mounted within said tubular axle and defining a high pressure reservoir and a low pressure reservoir, and
   said fluid inlet and said fluid outlet communicating respectively with said low pressure reservoir and said high pressure reservoir.

3. The brake system of claim 2 wherein:
   said fluid pump includes a pump housing detachably mounted co-axially within said axle and includes a plurality of axially oriented cylinders disposed in an annular array about the axis of said axle, and
   said cylindrical tube includes a radial flange sealingly engaging said pump housing and defining therewith an annular chamber communicating with said fluid outlet.

4. The brake system of claim 3 wherein the outlet of each of said cylinders is normally closed by a check valve defined by a flat spring, each of said flat springs radiating outward from a common hub.

5. The brake system of claim 4 wherein said means for deactivating said pump includes tension spring means retracting the pistons thereof from engagement by said wobble plate.

6. The brake system of claim 3 wherein said restricting means includes a differential check valve for controlling communication of fluid from said high pressure reservoir to said low pressure reservoir.

7. The brake system of claim 6 wherein said differential check valve is controlled by said air pressure responsive check valve.

* * * * *